United States Patent
Ronge (10) Patent No.: US 8,565,988 B2
(45) Date of Patent: Oct. 22, 2013

(54) METHOD FOR CONTROLLING A DRIVE TRAIN OF A MOTOR VEHICLE

(75) Inventor: Ludger Ronge, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1002 days.

(21) Appl. No.: 12/598,766

(22) PCT Filed: Apr. 28, 2008

(86) PCT No.: PCT/EP2008/055133
§ 371 (c)(1),
(2), (4) Date: Nov. 4, 2009

(87) PCT Pub. No.: WO2008/141894
PCT Pub. Date: Nov. 27, 2008

(65) Prior Publication Data
US 2010/0076653 A1    Mar. 25, 2010

(30) Foreign Application Priority Data
May 24, 2007    (DE) .......................... 10 2007 024 363

(51) Int. Cl.
*B60W 10/02* (2006.01)
*B60W 10/10* (2012.01)
*G06F 7/00* (2006.01)

(52) U.S. Cl.
USPC ............... 701/58; 701/68; 477/118; 477/122; 477/174

(58) Field of Classification Search
USPC ........ 701/68, 58, 64, 51, 52, 67; 477/80, 116, 477/166, 174, 175, 70, 74, 118, 122, 169, 477/17; 192/3.51, 32
See application file for complete search history.

(56) References Cited

U.S. PATENT DOCUMENTS

| 5,415,604 | A |   | 5/1995 | Bates et al. |
| 5,460,580 | A |   | 10/1995 | Streib |
| 5,664,458 | A | * | 9/1997 | Stasik et al. ................. 74/336 R |
| 5,741,202 | A |   | 4/1998 | Huber |
| 6,109,407 | A | * | 8/2000 | Bockmann et al. .......... 192/3.63 |
| 6,536,569 | B2 | * | 3/2003 | Nishimura .................... 192/3.58 |

(Continued)

FOREIGN PATENT DOCUMENTS

| DE |   43 15 843 A1 | 11/1994 |
| DE | 693 09 580 T2  | 11/1997 |

(Continued)

*Primary Examiner* — Christine Behncke
(74) *Attorney, Agent, or Firm* — Davis & Bujold, PLLC; Michael J. Bujold (57) ABSTRACT

A method of controlling a drivetrain of a vehicle in which the drivetrain comprises a motor, a transmission with starting gears and a clutch located between the motor and transmission, a manual shift lever, and a control unit, for controlling the transmission and clutch, that communicates with a speed sensor, and an accelerator pedal and shift lever actuation sensors. When starting off from coasting, a starting gear is determined in a manner that can be influenced by the driver via actuating the manual shift lever. To assist the driver, it is checked whether the transmission is in neutral and the clutch is engaged, if the vehicle speed is within a specified speed range. If so, the clutch is disengaged, another gear is engaged, and starting is initiated in combination with situation-dependent clutch engagement and carried out as a function of accelerator pedal actuation, provided the shift lever has not been actuated.

19 Claims, 3 Drawing Sheets

(56) References Cited

U.S. PATENT DOCUMENTS

| | | | |
|---|---|---|---|
| 7,001,307 B2* | 2/2006 | Matsunaga et al. | 477/118 |
| 2001/0023385 A1* | 9/2001 | Nishimura et al. | 701/51 |
| 2004/0138027 A1* | 7/2004 | Rustige et al. | 477/175 |

FOREIGN PATENT DOCUMENTS

| | | |
|---|---|---|
| DE | 298 02 183 U1 | 5/1998 |
| DE | 697 02 977 T2 | 4/2001 |
| DE | 100 24 024 A1 | 11/2001 |
| DE | 696 14 013 T2 | 3/2002 |
| DE | 696 23 063 T2 | 5/2003 |
| EP | 0 584 986 A1 | 3/1994 |
| EP | 0 602 685 A1 | 6/1994 |
| EP | 0 943 844 A2 | 9/1999 |
| EP | 1 016 810 A2 | 7/2000 |
| EP | 1 156 236 A1 | 11/2001 |

* cited by examiner

METHOD FOR CONTROLLING A DRIVE TRAIN OF A MOTOR VEHICLE

This application is a National Stage completion of PCT/EP2008/055133 filed Apr. 28, 2008, which claims priority from German patent application no. 10 2007 024 363.6 filed May 24, 2007.

FIELD OF THE INVENTION

The invention concerns a method for controlling a drivetrain of a motor vehicle, which comprises a drive motor, an automated manual transmission with a plurality of starting gears, an automated clutch arranged in the force flow between the drive motor and the transmission, and a manual shift lever which can be moved in an upshift direction to manually initiate an upshift and in a downshift direction to manually initiate a downshift, and in which the transmission together with the clutch can be controlled by a transmission control unit connected at least to a speed sensor, an accelerator pedal actuation sensor and a manual shift lever actuation sensor, such that when starting from a condition in which the vehicle is coasting, a determination of a starting gear that can be influenced by the driver by actuating the manual shift lever takes place.

BACKGROUND OF THE INVENTION

To adapt to the rolling resistance and rolling speed at the time, manual transmissions in some types of motor vehicles, particularly heavy utility vehicles, have more than one starting gear. Accordingly, when starting up from a coasting vehicle situation, the driver is faced with the problem of selecting and engaging the starting gear best suited for the current rolling resistance, determined essentially by the load status and the road inclination, and the current rolling speed.

In this connection the term 'coasting vehicle' is understood to mean a forward movement of the motor vehicle within a speed range above a lower reference speed close to the vehicle's being at rest and below a higher reference speed corresponding to a low driving speed, during which the transmission is in the neutral driving position N and/or the clutch is completely disengaged. Coasting of the vehicle can occur during ordinary driving operation, for example in urban traffic in the form of coasting before reaching a red traffic-light, from which, in the chosen example when the light turns green, it is often desired to accelerate again without the motor vehicle previously having come to rest. But vehicle coasting can also take place from rest, if the motor vehicle is on a downhill stretch and begins rolling when the parking brake or the working brake is released but before a starting gear has already been engaged and/or the clutch engaged.

It is true that with an automated drivetrain of the type mentioned at the beginning, on starting up from the coasting condition in most cases the starting gear to be engaged is determined automatically at least as a function of the current driving or rolling speed and perhaps also of the current deflection path of the accelerator pedal. However, unless at the same time the current load status and/or the road inclination are also determined sufficiently accurately and taken into account when determining the starting gear, the starting gear determined automatically may not be suitable for the actual driving situation at the time. In such a case, in a modern automated drivetrain the possibility exists that the starting gear determination can be influenced by the driver by actuating the manual shift lever, or that the starting gear determination carried out automatically by the transmission control unit can be corrected or changed by the driver by actuating the manual shift lever.

A first drivetrain of this type is described in EP 0 602 685 B1. This known drivetrain also comprises a manual shift lever which, in the upshift direction and in the downshift direction has a respective first or third shift position close to the neutral position and a second or fourth shift position farther away from the neutral position, and which is also provided with at least one pressure switch.

With the drivetrain, if the driving speed is above a specified minimum speed, a movement of the manual shift lever to the first shift position when a gear is engaged brings about a shift to the next-higher gear, provided that in the next-higher gear the rotation speed limits of the drive motor are respected; otherwise, the shift command is ignored. When the transmission is in its neutral position or if at the same time the pressure switch is actuated, then in contrast movement of the manual shift lever to the first shift position initiates a shift to the highest permissible gear. If the measured shift lever is moved to the second shift position, then if the speed is higher than the specified minimum value and a gear is engaged, then provided this is permissible a shift takes place to the second-higher gear or, if necessary, to the next-higher gear. In contrast, if the transmission is in neutral or if the pressure switch is actuated at the same time, movement of the manual shift lever to the second shift position also brings about a shift to the highest permissible gear.

If the manual shift lever is moved to the third shift position, then if the speed is higher than the specified minimum and a gear is engaged, provided that this is acceptable, a shift to the next-lower gear takes place. In contrast, if the transmission is in neutral or if at the same time the pressure switch is actuated, movement of the manual shift lever to the third shift position beings about a shift to the lowest permissible gear. If the manual shift lever is moved to the fourth shift position, then if the speed is higher than the specified minimum speed and a gear is engaged, provided that this is permissible, a shift takes place to the second-lower gear or if necessary to the next-lower gear. If the transmission is in neutral or if at the same time the pressure switch is actuated, then movement of the manual shift lever to the fourth shift position initiates an emergency shift to a still permissible, extreme low gear.

Thus, the known drivetrain offers a number of operating options which, however, can also lead to erroneous operations by the driver. Besides, no distinction is made between vehicle coasting at a relatively low travel speed and an open drivetrain at higher speed. Disadvantageously, the driver is assisted only indirectly when selecting an optimum starting gear, namely in that the engagement of an impermissible gear is prevented.

Another drivetrain of this type is known from U.S. Pat. No. 5,664,458 A. In this drivetrain a manual shift lever is provided, which can be moved in an upshift direction for the manual initiation of an upshift and in a downshift direction for the manual initiation of a downshift. When the transmission is shifted to its neutral position and the current driving speed is above a specified minimum reference speed, a "start from vehicle coasting" operating mode is activated, in which a single movement of the manual shift lever in the upshift direction brings about the engagement of an automatically determined gear appropriate for the travel speed at the time.

If the drivetrain comprises a clutch that can be actuated by the driver by means of a clutch pedal, for this function a signal from an actuation sensor that indicates the disengaged condition of the clutch must also be present. Thus, in selecting the appropriate starting gear the driver is assisted directly, but has to actuate the manual shift lever for this. Since the starting gear is automatically determined only as a function of the current travel speed, this preselected starting gear may not be appropriate and this may sometimes call for corrective action by the driver in the form of further manual shift lever operations. In the case of this drivetrain too, no distinction is made between a vehicle coasting at relatively low speed and a disengaged drivetrain at higher speed.

SUMMARY OF THE INVENTION

Against this background the purpose of the present invention is to indicate an improved method for controlling a drivetrain of the type mentioned to begin with, by means of which, when starting from a coasting vehicle situation the driver is optimally assisted and can influence the determination of the starting gear in a simple manner.

The invention concerns a method for controlling a drivetrain of a motor vehicle which comprises a drive motor, an automated manual transmission with a plurality of starting gears, an automated clutch arranged in the force flow between the drive motor and the transmission, and a manual shift lever which can be moved in an upshift direction to manually initiate an upshift and in a downshift direction to manually initiate a downshift, and in which the transmission together with the clutch can be controlled by a transmission control unit connected at least to a speed sensor, an accelerator pedal actuation sensor and a manual shift lever actuation sensor, such that when starting from a vehicle coasting condition a determination of a starting gear that can be influenced by the driver by actuating the manual shift lever takes place.

To achieve the stated objective it is also provided that if the travel speed $v_F$ is within a specified rolling speed range it is checked whether the transmission is in neutral $G_i=N$ and the clutch is engaged $x_K=1$, and if so, the clutch is disengaged, a preselected gear is engaged, the clutch is at first kept disengaged and starting in the preselected gear in combination with engagement of the clutch is initiated depending on events, and is carried out as a function of the actuation of the accelerator pedal $x_K=f(x_{FP})$ provided that no actuation of the manual shift lever previously takes place.

In that if the travel speed $v_F$ is within the coasting speed range with the transmission shifted into neutral ($G_i=N$), a gear predetermined or determined by the shifting program of the transmission is engaged, it is ensured that starting off from a coasting vehicle condition can be controlled by the driver solely by actuating the accelerator pedal. Thus, when selecting a suitable starting gear the driver is assisted as much as possible, but also has the option, by a corresponding actuation of the manual shift lever, to determine a different starting gear and start off from the vehicle coasting state in this other starting gear. The procedure for selecting the starting gear thus takes place between two, or as will be seen later, between at most three gears and can be carried out by the driver in a relatively simple and understandable manner. Accordingly, the risk of erroneous operation by the driver is low. But if nevertheless the starting gear predetermined automatically or selected by the driver is not optimal for the starting process from the vehicle coasting in progress, then, as also during ordinary driving operation, the driver can at any time initiate an upshift or a downshift by actuating the manual shift lever appropriately.

The coasting speed range is expediently delimited by a lower reference speed $v_{Ref-1}$ of zero or close to zero and an upper reference speed $v_{Ref-2}$ that corresponds to a low driving speed, so that the existence of a travel speed corresponding to a coasting speed can be determined very simply by comparing the current travel speed $v_F$ with the two reference speeds $v_{Ref-1}$, $v_{Ref-2}$ ($v_{Ref-1}<v_F\leq v_{Ref-2}$).

The driving speed $v_F$ is preferably determined by a speed sensor arranged on the output shaft of the transmission, and passed on to the transmission control unit.

If the coasting speed range is reached and a gear has already been or is still engaged ($G_i\neq N$) and the clutch is disengaged ($x_K=0$), it is preferable for starting to take place immediately in the engaged gear in combination with the engagement of the clutch, depending on the actuation of the accelerator pedal ($x_K=f(x_{FP})$). If the coasting speed range is reached from when the vehicle is at rest, the gear engaged corresponds to a starting gear for when the vehicle is at rest or coasting at a low speed. If the coasting speed range is reached when driving at a higher speed, then the gear engaged very probably corresponds to a starting gear for a high travel speed. Thus it is not necessary to determine a new starting gear and shift to that starting gear, so immediate starting or acceleration in the gear engaged is possible.

A first variant of the method provides that the highest starting gear $G_{A-max}$ appropriate for the upper reference speed $v_{Ref-2}$ is used as the preselected starting gear, and starting with this highest starting gear $G_{A-max}$ takes place when the driving speed $v_F$ reaches or exceeds the upper reference speed $v_{Ref-2}$, i.e. when $v_F\geq v_{Ref-2}$.

However, this procedure for automatically starting in the highest starting gear $G_{A-max}$ presupposes that the driving speed $v_F$ is increasing within the coasting speed range, i.e. that positive acceleration is taking place ($a_F>0$), which is not always the case. It is therefore advantageous for starting in the highest starting gear $G_{A-max}$ to be initiated, in addition, after the lapse of a predetermined time interval $t_w$ ($t>t_w$).

But if the manual shift lever is actuated in the upshift direction ($x_{SH+}=1$) before an initiation criterion has been reached, i.e. before reaching or exceeding the upper reference speed $v_{Ref-2}$ and before the time interval $t_w$ has passed, then a shift from the preselected gear to the starting gear $G_{A-opt}$ that best suits the driving speed $v_F$ at the time is carried out. Starting off with the optimum starting gear $G_{A-opt}$ then takes place immediately in combination with the engagement of the clutch and as a function of the actuation of the accelerator pedal ($x_K=f(x_{FP})$).

Thus, with this method variant the driver has a choice between the highest starting gear $G_{A-max}$, which is engaged automatically, and the starting gear $G_{A-opt}$ best suited for the driving speed at the time, i.e. the optimum starting gear, whose engagement is initiated by actuating the manual shift lever in the upshift direction ($x_{SH+}=1$).

Since various vehicle accelerations $a_F$ are possible within the coasting speed range, it is particularly advantageous to determine the current driving acceleration $a_F$ of the motor vehicle first, and to determine the preselected gear and the event for initiating start-off in the preselected gear as a function of the current driving acceleration $a_F$. The current acceleration $a_F$ can be calculated quite simply as the quotient of the difference between the two last-determined speed values $v_{F1}$, $v_{F2}$ and the time interval $\Delta t$ between them, using the equation $a_F=(v_{F2}-v_{F1})/\Delta t$.

Accordingly, in a second method variant it is provided that if there is a positive acceleration ($a_F>0$, $a_F>a_{Ref-2}>0$) the highest starting gear $G_{A-max}$ appropriate for the upper reference speed $v_{Ref-2}$ is used as the preselected starting gear, and starting in this highest starting gear $G_{A-max}$ is initiated when the driving speed $v_F$ reaches or exceeds the upper reference speed $v_{Ref-2}$ ($v_F\geq v_{Ref-2}$).

Likewise, this method variant provides that if there is a negative acceleration ($a_F<0$, $a_F<a_{Ref-1}<0$) the lowest starting gear $G_{A-min}$ appropriate for the lower reference speed $v_{Ref-1}$ is used as the preselected starting gear, and starting in this lowest starting gear $G_{A-min}$ is initiated when the driving speed $v_F$ reaches or falls below the said lower reference speed $v_{Ref-1}$ ($V_f \leq V_{Ref-1}$).

If the driving acceleration is very low ($a_F \approx 0$), an intermediate starting gear $G_{A-mit}$ appropriate for an average driving speed in the coasting speed range, or alternatively, the starting gear $G_{A-opt}$ best suited to the driving speed $v_F$ at the time can be used as the preselected starting gear, and starting in this intermediate starting gear $G_{A-mit}$ or in the optimum starting gear $G_{A-opt}$ is initiated after the lapse of a predetermined time ($t > t_w$).

The existence of a low driving acceleration is preferably determined by comparing the current acceleration $a_F$ with a predetermined low negative reference acceleration ($a_{Ref-1} < 0$) and a predetermined low positive reference acceleration ($a_{Ref-2} > 0$). If the current acceleration $a_F$ is larger than or equal to the negative reference acceleration $a_{Ref-1}$ and smaller than or equal to the positive reference acceleration $a_{Ref-2}$ ($a_{Ref-1} \leq a_F \leq a_{Ref-2}$), then the acceleration is by definition low.

In this method variant too the driver can choose between two respective starting gears, and in each case only the starting gear $G_{A-max}$, $G_{A-min}$, $G_{A-mit}$, $G_{A-opt}$ preselected by the shifting program changes depending on the acceleration $a_F$. The other starting gear is expediently the optimum starting gear $G_{A-opt}$ for the driving speed $v_F$ at the time, into which a shift is made from the preselected gear if the manual shift lever is actuated in the upshift direction ($x_{SH+}=1$) before the initiation criterion has been reached.

In contrast, in a third method variant it is provided that the starting gear $G_{A-opt}$ appropriate for the driving speed $v_F$ at the time is used as the preselected starting gear, and that starting in the optimum starting gear $G_{A-opt}$ is initiated when a predetermined time interval has lapsed ($t > t_w$).

In this method variant a shift from the preselected gear to the highest permissible starting gear ($G_{A-max}$) is preferably initiated by actuating the manual shift lever in the upshift direction ($x_{SH+}=1$), whereas on the other hand a shift from the preselected gear to the lowest starting gear $G_{A-min}$ is preferably initiated by actuating the manual shift lever in the downshift direction ($x_{SH+}=1$), and starting in the highest or lowest starting gear, $G_{A-max}$, $G_{A-min}$ respectively, takes place immediately in combination with engagement of the clutch and as a function of the actuation of the accelerator pedal ($x_K = f(x_{FP})$). The driver can therefore choose between three starting gears, of which the preselected starting gear $G_{A-opt}$ is engaged automatically and the use of the highest starting gear $G_{A-max}$ and the lowest starting gear $G_{A-min}$ require a corresponding actuation of the manual shift lever.

To avoid erroneous operation by the driver, in the case of a transmission initially in its neutral position N the automatically engaged preselected starting gear and the starting gears that can be engaged by actuating the manual shift lever are indicated in a display arranged within the driver's field of view. Thus, the driver is informed at all times about the shift options currently available, and can use them as necessary.

BRIEF DESCRIPTION OF THE DRAWINGS

To clarify the invention, a description of figures illustrating example embodiments is attached. The figures show.

DETAILED DESCRIPTION OF THE PREFERRED EMBODIMENTS

Figure 1:
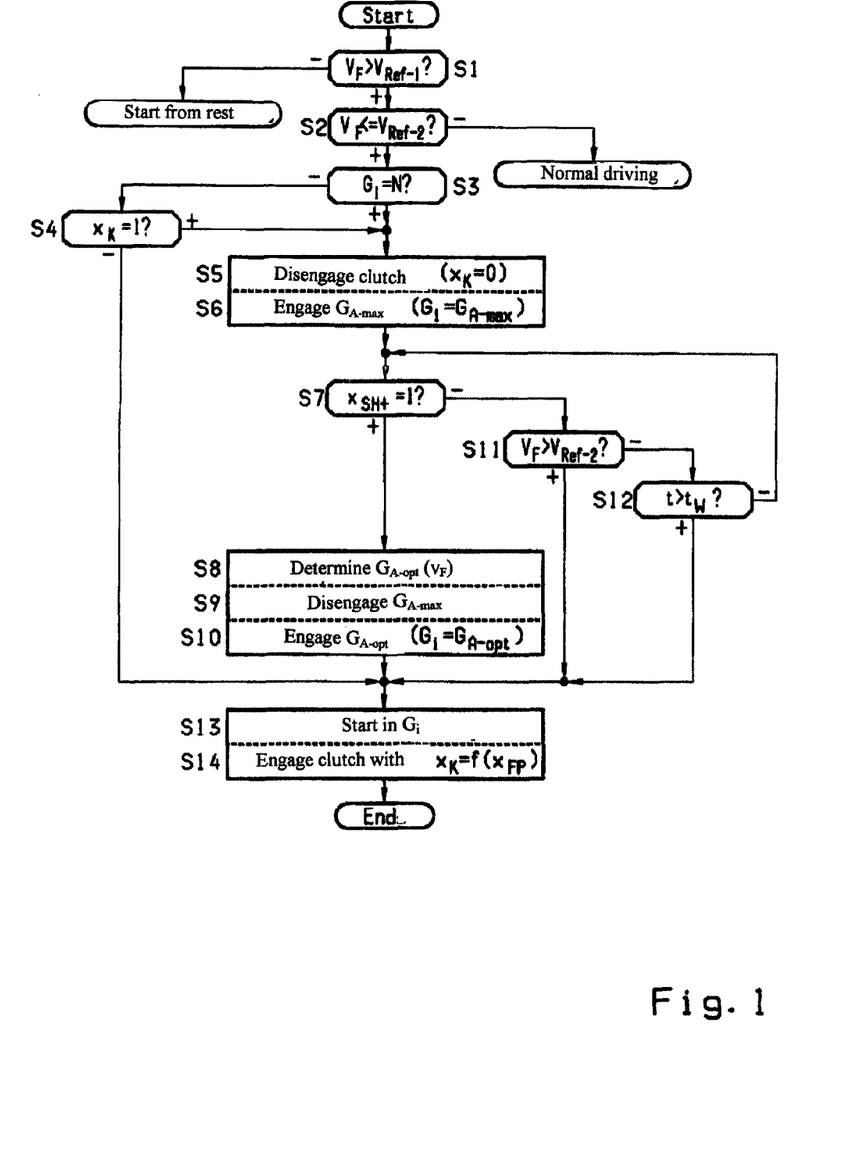
FIG. 1: Flow chart of a first variant of the control method according to the invention.

In a first method variant illustrated in FIG. 1, within the control sequence of a transmission control system it is checked in step S1 whether the current travel speed $v_F$ of the motor vehicle is higher than a lower reference speed $v_{Ref-1}$ which is close to zero ($v_F > v_{Ref-1}$). If not, the vehicle is at rest and a start-from-rest procedure is followed. If the condition is fulfilled, in step S2 it is checked whether the current travel speed $v_F$ has reached or is lower than an upper reference speed $v_{Ref-2}$ that corresponds to a low driving speed ($v_F \leq v_{Ref-2}$). If not, then the driving speed is normal and the control applied relates to normal driving operation.

If both conditions are fulfilled, the motor vehicle is within a coasting speed range delimited by the two sequence reference speeds $v_{Ref-1}$ and $v_{Ref-2}$ ($v_{Ref-1} < v_F \leq v_{Ref-2}$). In that case, in step S3 it is checked whether the transmission is in neutral, i.e. whether the gear $G_i$ engaged corresponds to the neutral driving stage N. If not, i.e. if a gear is engaged ($G_i \neq N$), then in step S4 it is checked whether the clutch is fully engaged, i.e. whether the degree of engagement of the clutch $x_K$ is equal to 100% or 1. If not, then in steps S13 and S14 starting is carried out in the engaged gear $G_i$, and the clutch ("Kpl") is engaged as a function of the accelerator pedal position $x_{FP}$ of the accelerator pedal that can be operated by the driver ($x_K = f(x_{FP})$). But if a gear is engaged or the clutch is engaged, then in step S5 the clutch is disengaged ($x_K = 0$) and in step S6, as the preselected starting gear, a starting gear appropriate for the upper reference speed $v_{Ref-2}$, termed the highest starting gear $G_{A-max}$, is engaged.

Thereafter, in step S7 it is checked repeatedly and cyclically whether the manual shift lever has been actuated in the upshift direction ($x_{SH+}=1$). If so, then in step S8 a starting gear $G_{A-opt}(v_F)$ appropriate for the current driving speed $v_F$, i.e. an optimum gear is determined, then in step S9 the previously engaged highest starting gear $G_{A-max}$ is disengaged again, and in step S10 the optimum, appropriate starting gear $G_{A-opt}$ is engaged. After this, in steps S13 and S14 starting takes place with the engaged starting gear $G_i = G_{A-opt}$ by engaging the clutch.

However, if the manual shift lever has not been actuated in the upshift direction, in step S11 it is checked whether the current driving speed $v_F$ has exceeded the upper reference speed $v_{Ref-2}$ so that $v_F > v_{Ref-2}$. If so, then in steps S13 and S14 starting is carried out by engaging the clutch, in this case with the highest starting gear $G_{A-max}$ engaged, which is appropriate for the upper reference speed $v_{Ref-2}$ ($G_i = G_{A-max}$). But if the upper reference speed $v_{Ref-2}$ has not been exceeded, then in step S12 it is checked whether a specified waiting time has lapsed ($t > t_w$). If so, i.e. if the waiting time $t_w$ has lapsed, then again starting takes place in the highest starting gear $G_{A-max}$ which was engaged in step S6. But so long as this is not the case, the sequence branches back to step S7 and the interrogation loop described is repeated.

Summarizing the above, this means that starting is carried out in the highest starting gear $G_{A-max}$ when the travel speed $v_F$ is higher than the upper reference speed $v_{Ref-2}$ or when the waiting time $t_w$ has lapsed, and provided that no previous actuation of the manual shift lever in the upshift direction has taken place. But if the manual shift lever has been actuated in the upshift direction before the upper reference speed $v_{Ref-2}$ has been exceeded and before the waiting time $t_w$ has passed, then starting takes place immediately in the starting gear $G_{A-opt}$ which is optimum for the current driving speed $v_F$.

Figure 2:
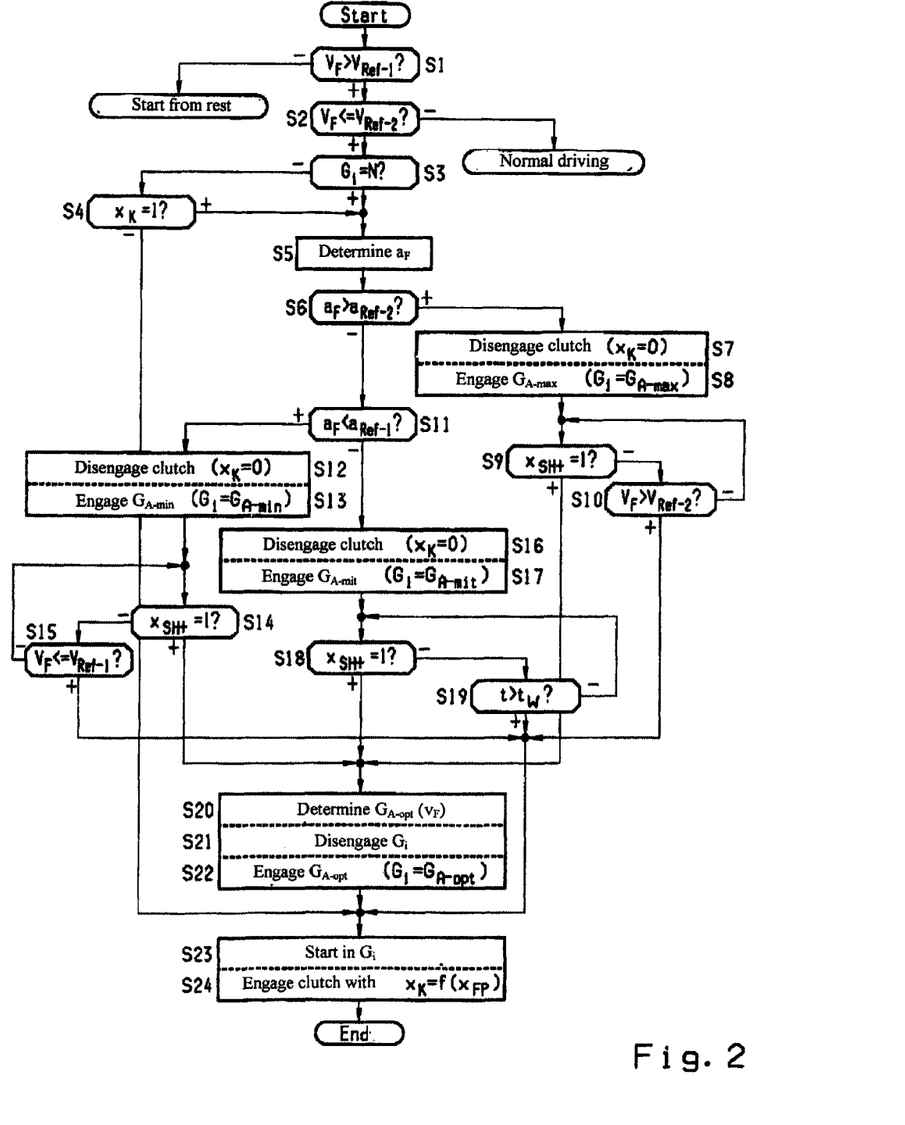
FIG. 2: Flow chart of a second variant of the control method according to the invention.

In a further developed, second method variant according to FIG. 2, steps S1 to S4 are identical to those of the variant in FIG. 1. The difference from the first variant is that now, the predetermined starting gear and the initiation criterion for starting in the preselected starting gear are determined as a function of the current driving acceleration $a_F$.

For this, in step S5 the current acceleration $a_F$ is determined. Then, in step S6 it is checked whether the current acceleration $a_F$ is above a small, positive reference acceleration $a_{Ref-2}$. If so, then in step S7 the clutch is disengaged and in step S8 the highest starting gear $G_{A-max}$ appropriate for the upper reference speed $v_{Ref-2}$ is engaged.

After this, in step S9 it is checked whether the manual shift lever has been actuated in the upshift direction ($x_{SH+}=1$). If so, then in steps S20 to S22 the starting gear $G_{A-opt}$ best suited for the current driving speed $v_F$ is determined, the current gear is disengaged and a shift to the optimum starting gear $G_{A-opt}$ is carried out, and in steps S23 and S24 starting takes place by engaging the clutch, still in this gear ($G_i=G_{A-opt}$), the engagement of the clutch taking place as a function of the accelerator pedal position $x_{FP}$ ($x_K=f(x_{FP})$).

On the other hand, if the manual shift lever has not been actuated in the upshift direction, then in step S10 it is checked whether the current travel speed $v_F$ has exceeded the upper reference speed $v_{Ref-2}$. If so, in steps S23 and S24 starting takes place in the then engaged highest starting gear $G_{A-max}$.

However, if the upper reference speed $v_{Ref-2}$ has not yet been exceeded, the system branches back to step S9. This means that if the positive driving acceleration is sufficiently high ($a_F>a_{Ref-2}$) when the upper reference speed $v_{Ref-2}$ is exceeded, starting takes place in the highest starting gear $G_{A-max}$ provided that the manual shift lever has not previously been actuated in the upshift direction, which would then initiate an immediate start in the optimum starting gear $G_{A-opt}$.

On the other hand, if the check in step S11 shows that the current acceleration $a_F$ is below a small, negative reference acceleration $a_{Ref-1}$, then in step S12 the clutch is disengaged and in step S13 the lowest starting gear $G_{A-min}$, which is appropriate for the lower reference speed $v_{Ref-1}$, is engaged. Then, in step S14 it is checked whether the manual shift lever has been actuated in the upshift direction ($x_{SH+}=1$). If so, then in steps S20 to S22 the starting gear $G_{A-opt}$ most suitable for the current travel speed $v_F$ is determined, the previously engaged gear $G_i$ is disengaged, and a shift is carried out to the said optimally suited gear, and in steps S23 and S24 starting is effected by engaging the clutch in this optimum gear ($G_i=G_{A-opt}$).

In contrast, if the manual shift lever has not been actuated in the upshift direction, then in step S15 it is checked whether the current travel speed $v_F$ has reached or fallen below the lower reference speed $v_{Ref-1}$. If so, then in steps S23 and S24 starting takes place in the lowest starting gear $G_{A-min}$ then engaged. But if the speed has not yet reached or fallen below the lower reference speed $v_{Ref-1}$, the system branches back to step S14. This means that if the negative acceleration is sufficiently large ($a_F<a_{Ref-1}$) on reaching or falling below the lower reference speed $v_{Ref-1}$, starting takes place in the lowest starting gear $G_{A-min}$, provided that the manual shift lever has not previously been actuated in the upshift direction, which would bring about immediate starting in the optimum starting gear $G_{A-opt}$.

If neither of the conditions of steps S6 and S11 are fulfilled, i.e. if the acceleration $a_F$ is close to zero, then in step S16 the clutch is disengaged and in step S17 an intermediate starting gear $G_{A-mit}$ appropriate for an average coasting speed is engaged. Then, in step S18 it is checked whether the manual shift lever has been actuated in the upshift direction ($x_{SH+}=1$). If so, then in steps S20 to S22 the starting gear $G_{A-opt}$ optimally suited for the current driving speed $v_F$ is determined, the previous gear is disengaged, and a shift is made into the optimum gear, after which, in steps S23 and S24 the clutch is engaged and starting takes place in this optimum gear ($G_i=G_{A-opt}$).

On the other hand, if the manual shift lever has not been actuated in the upshift direction, then in step S19 it is checked whether a specified waiting time $t_w$ has lapsed. If so, in steps S23 and S24 the clutch is engaged and starting takes place in the then engaged intermediate starting gear $G_{A-mit}$. But if the waiting time $t_w$ has not yet lapsed, the system branches back to step S18. This means that if the driving acceleration is small ($a_{Ref-1} \leq a_F \leq a_{Ref-2}$), after the lapse of the waiting time $t_w$ starting takes place in the intermediate starting gear $G_{A-mit}$, provided that the manual shift lever has not previously been actuated in the upshift direction, since the latter would initiate immediate starting in the optimum starting gear $G_{A-opt}$.

Figure 3:
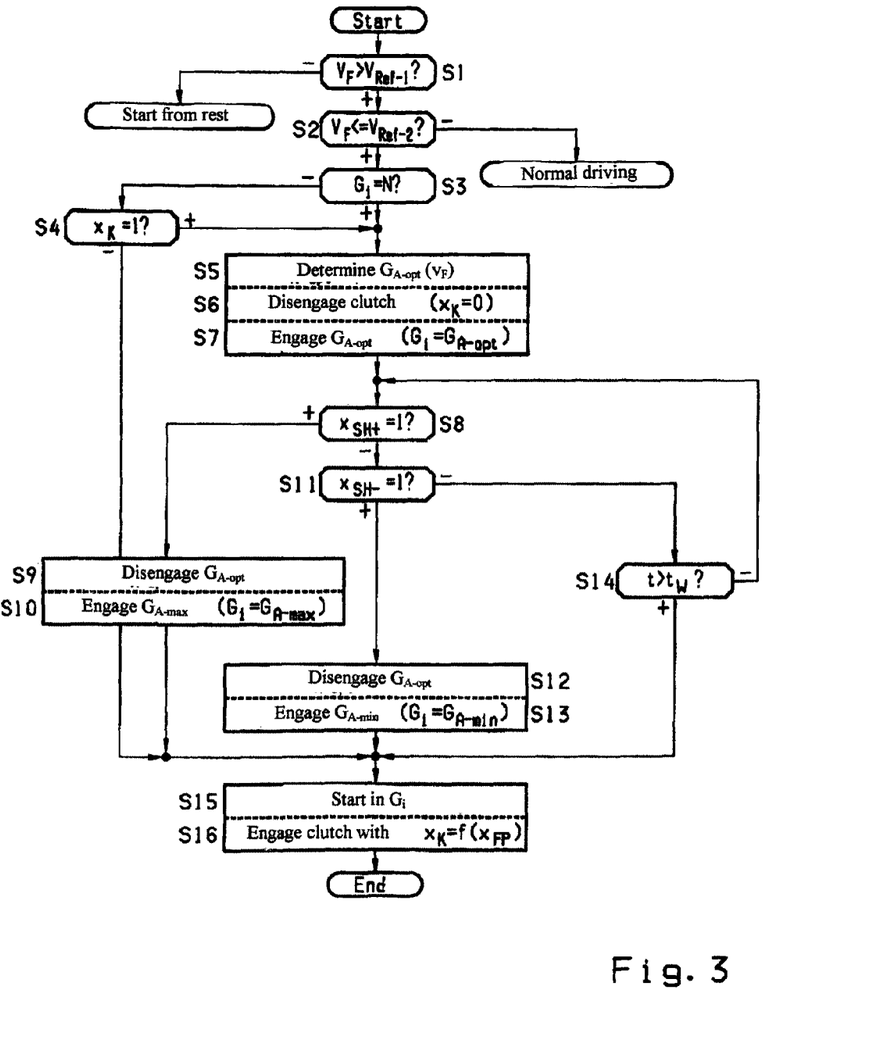
FIG. 3: Flow chart of a third variant of the control method according to the invention.

In a third method variant alternative to those above and illustrated in FIG. 3, the steps S1 to S4 are again identical to those in the variant according to FIG. 1. The difference from the first variant in FIG. 1 and the second variant in FIG. 2, is that this time in steps S5 to S7 the starting gear optimally suited for the current driving speed $v_F$ is determined, the clutch is disengaged and the optimally suitable starting gear $G_{A-opt}$ is engaged as the preselected starting gear. A choice of starting gear different from this can now be made by the driver, by moving the manual shift lever in the upshift direction or in the downshift direction.

For this, in step S8 it is checked whether the manual shift lever has been actuated in the upshift direction ($x_{sh+}=1$). If so, then in step S9 the engaged starting gear $G_{A-opt}$ is disengaged and the highest starting gear $G_{A-max}$ appropriate for the upper reference speed $v_{Ref-2}$ is engaged. Then, in steps S15 and S16 the clutch is engaged and starting takes place in this appropriate highest gear ($G_i=G_{A-max}$), the engagement of the clutch being controlled as a function of the accelerator pedal position $x_{FP}$ ($x_K=f(x_{FP})$).

If the check in step S8 proves negative, then in step S11 it is checked whether the manual shift lever has been actuated in the downshift direction ($x_{SH-}=1$). If so, then in step S12 the engaged starting gear $G_{A-opt}$ is disengaged and the lowest starting gear $G_{A-min}$ appropriate for the lower reference speed $v_{Ref-1}$ is engaged. Then, in steps S15 and S16, the clutch is engaged and starting takes place in the appropriate lowest starting gear ($G_i=G_{A-min}$).

If neither of the two conditions in steps S8 and S11 is fulfilled, i.e. no actuation of the manual shift lever has taken place, in step S14 it is checked whether a specified waiting time $t_w$ has lapsed. If this has not yet happened the system branches back to step S8, so that the checking steps in S8 and S11 are repeated several times so long as the result remains negative. But when the waiting time $t_w$ has lapsed ($t>t_w$), in steps S15 and S16 the clutch is engaged and starting takes place in the optimum starting gear $G_{A-opt}$ still engaged in this case.

This means that starting takes place in the starting gear $G_{A-opt}$ most appropriate for the current driving speed $v_F$, if the waiting time $t_w$ has lapsed and provided that the manual shift lever has not previously been actuated. But if the manual shift lever is actuated before the lapse of the waiting time $t_w$, then if this actuation is in the upshift direction, starting is initiated immediately in the highest starting gear $G_{A-max}$ appropriate for the upper reference speed $v_{Ref-2}$, whereas if the actuation is in the downshift direction, starting takes place immediately in the lowest starting gear $G_{A\text{-}min}$ appropriate for the lower reference speed $v_{Ref\text{-}1}$.

INDEXES $a_F$ Driving acceleration
$a_{Ref\text{-}1}$ Negative reference acceleration
$a_{Ref\text{-}2}$ Positive reference acceleration
$G_A$ Starting gear
$G_{A\text{-}max}$ Highest starting gear
$G_{A\text{-}min}$ Lowest starting gear
$G_{A\text{-}mit}$ Intermediate starting gear
$G_{A\text{-}opt}$ Optimum starting gear
$G_i$ Engaged gear
N Neutral gear, neutral position
S1-S24 Process steps
t Time
$t_w$ Time
$t_w$ Time interval, waiting time
$v_F$ Driving speed
$v_{F1}$ First speed value
$v_{F2}$ Second speed value
$v_{Ref\text{-}1}$ Lower reference speed
$v_{Ref\text{-}2}$ Upper reference speed
$x_{FP}$ Accelerator pedal position, accelerator pedal movement
$x_K$ Degree of clutch engagement
$x_{SH+}$ Movement of manual shift lever in upshift direction
$x_{SH-}$ Movement of manual shift lever in downshift direction
$\Delta t$ Time interval

The invention claimed is:

1. A method of controlling a drivetrain of a motor vehicle in which the drivetrain comprises a drive motor, an automated manual transmission with a plurality of starting gears and an automated clutch arranged in a force flow between the drive motor and the transmission, and a manual shift lever being movable in an upshift direction, to bring about an upshift, and in a downshift direction, to bring about a downshift, and the transmission together with the clutch are controlled by a transmission control unit connected to at least a speed sensor, an accelerator pedal actuation sensor and a manual shift lever actuation sensor such that, when starting off from a vehicle rolling condition, a starting gear is determined in a manner that is influenced by a driver via actuating the manual shift lever, if a speed of the vehicle ($V_F$) is within a specified coasting speed range, it is checked whether the transmission is shifted to neutral ($G_i$=N) and the clutch is engaged ($X_K$=1), and, in that case, the clutch is disengaged, a preselected starting gear is engaged, the clutch is at first kept disengaged and starting in the preselected starting gear is initiated in combination with a situation-dependent engagement of the clutch which is carried out as a function of actuation of the accelerator pedal ($X_K$=f($X_{FP}$)), provided that the manual shift lever has not previously been actuated.

2. The method according to claim 1, further comprising the step of defining the coasting speed range by a lower reference speed ($V_{Ref\text{-}1}$) of either zero or substantially zero and an upper reference speed ($V_{Ref\text{-}2}$) that corresponds to a low driving speed, and determining the existence of a driving speed corresponding to a coasting speed by comparing a current driving speed ($V_F$) with the lower and the upper reference speeds ($V_{Ref\text{-}1}$, $V_{Ref\text{-}2}$) in accordance with an inequality.

3. The method according to claim 2, further comprising the step of utilizing, as the preselected starting gear, a highest starting gear ($G_{A\text{-}max}$) appropriate for the upper reference speed ($V_{Ref\text{-}2}$), and initiating starting in the highest starting gear ($G_{A\text{-}max}$) when a current driving speed ($V_F$) either reaches or exceeds the upper reference speed.

4. The method according to claim 3, further comprising the step of further initiating starting in the highest starting gear ($G_{A\text{-}max}$) depending on a lapse of a predetermined time interval (($t_w$)($t > t_w$)).

5. The method according to claim 2, further comprising the step of determining a current driving acceleration ($A_F$) of the motor vehicle, and determining the preselected starting gear and an event that initiates starting in the preselected starting gear as a function of the current acceleration ($A_F$).

6. The method according to claim 5, further comprising the step of calculating the current acceleration ($A_F$) as a quotient of a difference between two last-determined speed values ($V_{F1}$, $V_{F2}$) and a time interval ($\Delta t$) between the two last-determined speed values ($A_F = (V_{F2} - V_{F1})/\Delta t$).

7. The method according to claim 5, further comprising the step of utilizing the highest starting gear ($G_{A\text{-}max}$) appropriate for the upper reference speed ($v_{Ref\text{-}2}$), as the preselected starting gear, if the current acceleration ($A_F$) is positive, and initiating starting in the highest starting gear ($G_{A\text{-}max}$) when the driving speed ($V_F$) either reaches or exceeds the upper reference speed.

8. The method according to claim 5, further comprising the step of utilizing the lowest starting gear ($G_{A\text{-}min}$) appropriate for the lower reference speed ($V_{Ref\text{-}1}$) as the preselected starting gear, if the current acceleration is negative, and initiating starting in the lowest starting gear ($G_{A\text{-}min}$) when the driving speed ($v_F$) either reaches or falls below the lower reference speed.

9. The method according to claim 5, further comprising the step of utilizing an intermediate starting gear ($G_{A\text{-}mit}$) appropriate for an average speed of the coasting speed range, as the preselected starting gear, if the current acceleration is approaching 0, and initiating starting in the intermediate starting gear ($G_{A\text{-}mit}$) upon a lapse of a predetermined time interval.

10. The method according to claim 9, further comprising the step of determining an existence of a acceleration by comparing the current acceleration ($A_F$) with a predetermined negative reference acceleration and a predetermined positive reference acceleration.

11. The method according to claim 5, further comprising the step of utilizing an optimum starting gear ($G_{A\text{-}opt}$) most appropriate for the driving speed ($V_F$) at a present time, as the preselected starting gear, if the current acceleration is approaching 0, and initiating starting in the optimum starting gear ($G_{A\text{-}opt}$) upon a lapse of a predetermined time interval.

12. The method according to claim 1, further comprising the step of determining the current driving speed ($V_F$) by a speed sensor arranged on an output shaft of the transmission.

13. The method according to claim 1, further comprising the step of, when a gear is engaged ($G_i \neq$ N) and the clutch is disengaged ($X_K$=0), starting with the engaged gear in combination with engaging the clutch as a function of the actuation of the accelerator pedal ($X_K$=f($X_{FP}$)).

14. The method according to claim 1, further comprising the step of initiating a shift from the preselected starting gear into an optimum starting gear ($G_{A\text{-}opt}$) for the speed of the vehicle ($V_F$) at a present time, if the manual shift lever is actuated in an upshift direction ($X_{SH+}$=1), and starting in the optimum starting gear ($G_{A\text{-}opt}$) in combination with engaging the clutch as a function of the actuation of an accelerator pedal ($X_K$=f($X_{FP}$)).

15. The method according to claim 1, further comprising the step of utilizing an optimum starting gear ($G_{A\text{-}opt}$) most appropriate for the speed of the vehicle ($V_F$) at a present time, as the preselected starting gear, and initiating starting in the optimum starting gear ($G_{A-opt}$) upon lapse of a predetermined time interval.

16. The method according to claim 1, further comprising the step of selecting an optimum starting gear ($G_{A-opt}$) most appropriate for the speed of the vehicle ($V_F$) at a present time as the preselected starting gear, initiating a shift from the preselected starting gear to a highest starting gear ($G_{A-max}$), if the manual shift lever is actuated in an upshift direction ($X_{SH+}=1$), and initiating starting in the highest starting gear ($G_{A-max}$) in combination with engaging the clutch as a function of the actuation of the accelerator pedal ($X_K=f(X_{FP})$).

17. The method according to claim 1, further comprising the step of selecting an optimum starting gear ($G_{A-opt}$) most appropriate for the speed of the vehicle ($V_F$) at a present time as the preselected starting gear, initiating a shift from the preselected starting gear to a lowest starting gear ($G_{A-min}$), if the manual shift lever is actuated in a downshift direction ($X_{SH-}=1$), and initiating starting in the lowest starting gear ($G_{A-min}$) in combination with engaging the clutch as a function of the actuation of the accelerator pedal ($X_K=f(X_{FP})$).

18. The method according to claim 1, further comprising the step of indicating the automatically engaged preselected starting gear and the starting gears that are engagable by actuating the manual shift lever in a display located within a field of view of the driver, if the transmission is initially in an idling condition.

19. A method of controlling a drivetrain of a motor vehicle to initiate driving when the vehicle is coasting, the drivetrain having a drive motor, an automated manual transmission with a plurality of starting gears and an automated clutch arranged in a flow of force between the drive motor and the transmission, and a manual shift lever that is actuatable in an upshift direction to bring about an upshift and in a downshift direction to bring about a downshift, and the transmission and the clutch being controlled by a transmission control unit that is connected to at least a speed sensor, an accelerator pedal actuation sensor and a manual shift lever actuation sensor, the method comprising the steps of:

confirming whether a drive speed ($V_F$) of the vehicle is greater than a lower reference speed ($V_{Ref-1}$) and is either less than or equal to an upper reference speed ($V_{Ref-2}$);

confirming that at least one of the transmission is in a neutral position and the clutch is engaged;

disengaging the clutch;

engaging a highest starting gear ($G_{A-max}$) in the transmission with the highest starting gear ($G_{A-max}$) being appropriate for initiating driving when the vehicle is coasting at the upper reference speed ($V_{Ref-2}$);

ascertaining an actuation state of the manual shift lever;

if the manual shift lever is actuated in the upshift direction, then confirming that at least one of the drive speed ($V_F$) of the vehicle is greater than the upper reference speed ($V_{Ref-2}$) and a specified period of time ($t_w$) has lapsed; and if the manual shift lever is not actuated in the upshift direction, then determining an optimum starting gear ($G_{A-opt}$) that is appropriate for initiating driving based on the drive speed ($V_F$) of the vehicle, disengaging in the transmission the highest starting gear ($G_{A-max}$) and engaging the optimum starting gear ($G_{A-opt}$);

initiating driving with a respective one of the highest starting gear ($G_{A-max}$) and the optimum starting gear ($G_{A-opt}$); and engaging the clutch as a function of accelerator pedal actuation.

* * * * *